Figure 1:
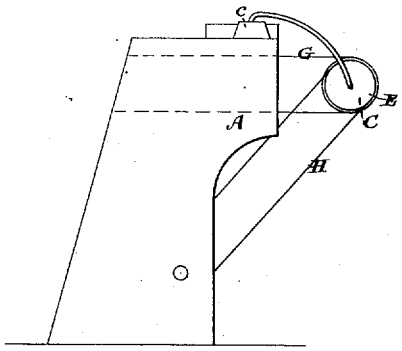

J. H. RYDER,

Assignor to W. GORDON.

Machine for Polishing the Edges of Boot and Shoe Heels.

No. 7,010. Reissued Dec. 30, 1879.

Witnesses.

E. B. Fairchild

Geo. W. Pierce.

Inventor,

J. H. Ryder by Wright & Brown

Attys.

N. PETERS, PHOTO-LITHOGRAPHER, WASHINGTON, D. C.

UNITED STATES PATENT OFFICE.

JOSHUA H. RYDER, OF BROCKTON, MASSACHUSETTS, ASSIGNOR TO WILLIAM GORDON.

IMPROVEMENT IN MACHINES FOR POLISHING THE EDGES OF BOOT AND SHOE HEELS.

Specification forming part of Letters Patent No. 165,260, dated July 6, 1875; Reissue No. 9,010, dated December 30, 1879; application filed October 29, 1879.

*To all whom it may concern:*

Be it known that I, JOSHUA H. RYDER, of Brockton, in the county of Plymouth and State of Massachusetts, have invented certain Improvements in Machines for Scouring the Edges of Boot and Shoe Heels, of which the following is a specification.

This invention relates to the class of heel-edge scouring-machines in which a rotating scouring cylinder or tool, circular in cross-section and of uniform diameter, is employed, the periphery of which moves crosswise of the heel-lifts instead of lengthwise thereof, the bottom of the heel being parallel or substantially in line with the axial line of the tool instead of at right angles with such line when the heel is being scoured.

In this class of machines it is desirable that the bottom of the heel be parallel with the axial line of the tool during the entire scouring operation, for if the bottom of the heel be inclined or diagonal to the axial line the concavity imparted the side of the heel will be diminished, as the tool will not then cut or move directly across the edges of the lifts, but will move diagonally, and therefore leave the side of the heel with less concavity than when the bottom of the heel is parallel with the axial line. Heretofore in machines of this class the scouring cylinder or tool has been located on a shaft which projects from one end of the roll and obstructs said end, so that the forward portion of the boot or shoe cannot be turned inwardly toward the axial line of the roll, and still be held with the bottom of the heel parallel to such line when the portion of the heel near one corner thereof is being scoured; hence the boot or shoe has to be inclined when the corner of the heel is reached, so that the tool is caused to flatten and partially destroy the concavity of the heel at the corner.

My invention has for its object, first, to provide an improved tool for a machine of the class above named which will enable the bottom of the heel to be held in the proper relation to the axial line of the tool during the scouring of the entire concave edge of the heel, and thereby obviate the objection above named.

The invention has for its object, secondly, to facilitate the application to and removal of the cylindrical scouring-tool, and the employment in the same machine of tools of different diameters.

To these ends my invention consists, first, in an arrangement, hereinafter described, on a centrally-supported shaft, of two rotary cylinders or scouring-surfaces, presenting two unobstructed circular ends, which enable a boot or shoe to be turned inwardly while either side of the heel is being scoured without inclining the bottom of the heel relatively to the axial line of the tool.

The invention also consists in the construction and combination of parts, all of which I will now proceed to describe and claim.

Figure 2:
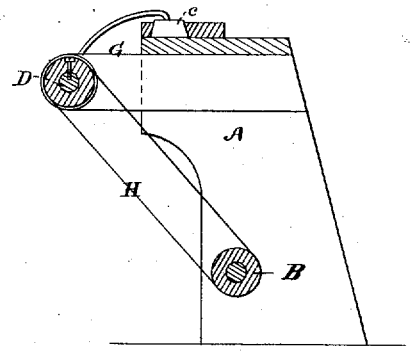
Figure 3:
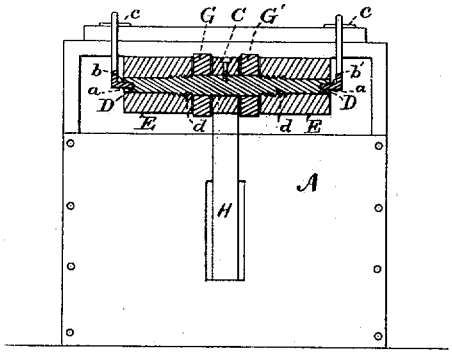
Figure 4:
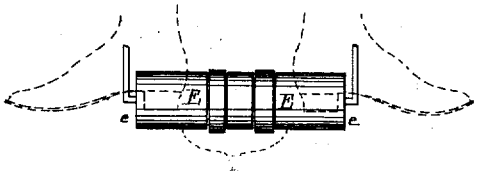
Figure 5:
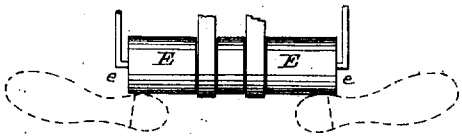

Of the accompanying drawings, forming a part of this specification, Figure 1 represents a side elevation, and Fig. 2 represents a vertical and transverse section, of a machine embodying my invention. Fig. 3 represents a vertical section taken longitudinally through the axis of the scouring-rolls. Fig. 4 represents a side view of my improved tool, showing in dotted lines the position of the boot or shoe while the sides of the heel are being scoured. Fig. 5 is a top view of the same.

Similar letters of reference indicate like parts in all the figures.

In carrying out my invention I employ two scouring surfaces or cylinders, E E, which are circular in cross-section and of uniform diameter, and are coated with sand-paper or other abrading material in any suitable manner. Said cylinders are located on a shaft, D, and are arranged to terminate at the outer ends of said shaft, so that the latter does not project to obstruct the outer ends of the cylinders. The shaft D is journaled and supported in intermediate arms, G G′, and is provided with a pulley, C, which is rotated by a belt, H, from a pulley on a driving-shaft, B.

A represents the frame which supports the arms G G′ and other parts of the machine. Each end of the shaft D is formed with a socket, *a*, to receive the journals or the ends of arms *b b'*, such having their upper ends connected with dovetailed sliders *c c*, which slide in ways arranged on the top of the frames. Such sliders, if desirable, may be provided with set-screws, to preserve them in position. The shaft D has formed on opposite sides of the pulley C two short male screws, *d d*, the cylinders E E also having corresponding female screws formed on the inner surface of their boxes, by which the cylinders may be secured to the shaft.

It will be seen that the described arrangement of the cylinders E E relatively to the ends of their shaft causes them to present two unobstructed ends, *e e*, facing in opposite directions, so that a boot or shoe can be turned inwardly from either of said ends, as shown in Figs. 4 and 5, without being inclined to avoid contact with the shaft or support of the cylinders.

In the operation of the machine the operator presents the back of the heel to one of the cylinders E, and turns the boot or shoe until one side is finished, and then presents the back of the heel to the other cylinder E and finishes the other side in the same manner.

Having effected the scouring of the heel-edges, the cylinders may be removed by unscrewing them, and the ordinary bottom-scouring roll and the shank-rollers (which are to be provided with screw-connections, like the edge-scouring cylinders) may be substituted, and the bottom or tread portions of the boot be scoured thereon.

By the employment of the sliding arms *b b'* for supporting the ends of the shaft, the cylinders may be readily removed from the shaft or applied thereto, as may be desirable.

I claim as my invention—

1. In a heel-scouring machine, the combination of two rotary cylinders, E, of uniform diameter or periphery, a shaft common to both, and supports G G' for such shaft, arranged between the ends of the cylinders, so as to give to the cylinders free or unobstructed outer ends, whereby the operator is enabled to hold the heel first on one side to one cylinder, and then on the other side to the other cylinder, in a plane parallel to the axial line of the cylinders, and so give the proper curvature to the heel without flattening its inner corners, substantially as specified.

2. In a heel-edge scouring-machine, the combination of the shaft D, rolls E E, pulley C, and sliding arms *b b'*, the whole being constructed and arranged substantially as and for the purpose set forth.

In testimony whereof I have signed my name to this specification in the presence of two subscribing witnesses this 20th day of October.

JOSHUA H. RYDER.

Witnesses:
W. W. WILKINS,
T. P. FIELD.